US008860973B2

(12) United States Patent
Miyajima

(10) Patent No.: US 8,860,973 B2
(45) Date of Patent: Oct. 14, 2014

(54) IMAGE PROCESSING APPARATUS, IMAGE PROCESSING METHOD, AND COMPUTER PROGRAM PRODUCT

(75) Inventor: Shota Miyajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1390 days.

(21) Appl. No.: 12/400,858

(22) Filed: Mar. 10, 2009

(65) Prior Publication Data

US 2009/0237706 A1   Sep. 24, 2009

(30) Foreign Application Priority Data

Mar. 18, 2008  (JP) .................................. 2008-070439

(51) Int. Cl.
*G06K 15/00* (2006.01)
*H04N 1/00* (2006.01)
*G03G 15/20* (2006.01)
*G03G 15/00* (2006.01)

(52) U.S. Cl.
CPC ....... *H04N 1/00896* (2013.01); *G03G 15/2078* (2013.01); *G03G 15/5004* (2013.01); *H04N 1/00* (2013.01); *H04N 1/00915* (2013.01); *H04N 1/00917* (2013.01); *H04N 1/00928* (2013.01); *H04N 2201/0094* (2013.01)
USPC ......................................... 358/1.14; 358/1.15

(58) Field of Classification Search
CPC .......... G03G 15/5004; H04N 1/00896; H04N 1/00915; H04N 1/00917; H04N 1/00928
USPC .................................................. 358/1.14, 1.1
See application file for complete search history.

(56) References Cited

U.S. PATENT DOCUMENTS

| 2003/0197902 A1* | 10/2003 | Miura ........................... 358/486 |
| 2003/0227642 A1* | 12/2003 | Anderson et al. ............ 358/1.13 |
| 2007/0240159 A1* | 10/2007 | Sugiyama ..................... 718/102 |
| 2007/0247467 A1* | 10/2007 | Kaneda ......................... 345/531 |

FOREIGN PATENT DOCUMENTS

| JP | 3226967 | 8/2001 |
| JP | 3389475 | 1/2003 |
| JP | 2003-156968 | 5/2003 |
| JP | 2006-31438 | 2/2006 |
| JP | 2006-293212 | 10/2006 |
| JP | 2006-331814 | 12/2006 |
| JP | 2007-58042 | 3/2007 |
| JP | 2007-102008 | 4/2007 |
| JP | 2007-193241 | 8/2007 |

* cited by examiner

*Primary Examiner* — King Poon
*Assistant Examiner* — Iriana Cruz
(74) *Attorney, Agent, or Firm* — Dickstein Shapiro LLP

(57) ABSTRACT

An image processing unit performs an image processing operation and further performs a setting operation causing a power load as a power load operation. A first control unit controls the image processing unit. A second control unit controls an operation of the first control unit by communicating with the first control unit. An interrupting unit interrupts the power load operation at a first timing after the first control unit is activated when the image processing apparatus is turned on. A resuming unit resumes the power load operation interrupted by the interrupting unit at a second timing.

9 Claims, 3 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-070439 filed in Japan on Mar. 18, 2008.

BACKGROUND OF THE INVENTION

1. Field of the Invention

The present invention relates to a technology for reducing power consumption of an image processing apparatus.

2. Description of the Related Art

With an increasing number of documents being used in offices, an image processing apparatus such as a printer, a copier, and a multifunction peripheral (MFP) is being used frequently. For example, an image formed on an original is read by a scanner, and image data of the image is stored in a computer via a network or is shared between computers in the network. Furthermore, the image data is printed out by transferring the image data to a printer, an MFP, etc.

In recent years, it has become a critical issue to improve efficiency in power usage in the image processing apparatus for the environmental conservation. Furthermore, the power consumption of the image processing apparatus is economically wasteful for a user especially when the image processing apparatus is in a standby mode or if the image processing apparatus cannot be efficiently used.

In conventional technologies, the image processing apparatus has a power saving mode in which the power consumption is reduced such as by stopping or reducing power supply to main components. When a predetermined time period elapses in a standby status, the image processing apparatus shifts to the power saving mode. In the power saving mode, for example, if a sheet is placed on an exposure glass, the image processing apparatus uses it as a trigger and shifts from the power saving mode to a normal mode. Then, necessary power or rated current is supplied to each essential component, thereby enabling usage of the image processing apparatus.

Japanese Patent Application Laid-open No. 2003-156968 discloses an image processing apparatus having a power saving mode. If printing is not performed for a predetermined time, for example, the image processing apparatus stops power supply to a fixing unit and shifts to a low-power-consumption mode. When returning to the normal mode, the temperature of the fixing unit for starting printing is determined based on a print mode for a job that is to be processed first.

In a technology disclosed in Japanese Patent Application Laid-open No. 2006-293212, when a voltage drop occurs during a warm-up in a copy-start enable status, contents of the settings may be initialized. Therefore, when a voltage drop is detected, the image processing apparatus is switched to a low-power operation mode in which the image processing apparatus operates with a power level lower than that in the normal operation mode.

However, the above conventional technologies still need improvement in reducing the power consumption while enhancing the usability of the image processing apparatus. Specifically, the technology disclosed in Japanese Patent Application Laid-open No. 2003-156968 is for shifting the operation mode to the power saving mode and returning back to the normal mode after the power is on and each unit in the image processing apparatus becomes stable. The technology disclosed in Japanese Patent Application Laid-open No. 2006-293212 is for operating the image processing apparatus in the voltage-drop status after the power is on and each unit in the image processing apparatus becomes stable. Therefore, the above conventional technologies do not address reduction of the power consumption in an unstable status immediately after the power is turned on. Typically, the image processing apparatus consumes large power and may cause errors immediately after the power is turned on. Therefore, it is desirable to reduce the power consumption at the time of turning on the image processing apparatus.

SUMMARY OF THE INVENTION

It is an object of the present invention to at least partially solve the problems in the conventional technology.

According to one aspect of the present invention, there is provided an image processing apparatus including an image processing unit that performs an image processing operation and further performs a setting operation causing a power load as a power load operation, a first control unit that controls the image processing unit, a second control unit that controls an operation of the first control unit by communicating with the first control unit, and a power supply unit that supplies power to a relevant unit, the image processing apparatus including an interrupting unit that interrupts the power load operation at a first timing after the first control unit is activated when the image processing apparatus is turned on; and a resuming unit that resumes the power load operation interrupted by the interrupting unit at a second timing.

Furthermore, according to another aspect of the present invention, there is provided an image processing method for an image processing apparatus including an image processing unit that performs an image processing operation and further performs a setting operation causing a power load as a power load operation, a first control unit that controls the image processing unit, a second control unit that controls an operation of the first control unit by communicating with the first control unit, and a power supply unit that supplies power to a relevant unit. The image processing method includes interrupting the power load operation at a first timing after the first control unit is activated when the image processing apparatus is turned on; and resuming the power load operation interrupted at the interrupting at a second timing.

Moreover, according to still another aspect of the present invention, there is provided a computer program product including a computer-usable medium having computer-readable program codes embodied in the medium for processing an image in an image processing apparatus including an image processing unit that performs an image processing operation and further performs a setting operation causing a power load as a power load operation, a first control unit that controls the image processing unit, a second control unit that controls an operation of the first control unit by communicating with the first control unit, and a power supply unit that supplies power to a relevant unit. The program codes when executed causes a computer to execute interrupting the power load operation at a first timing after the first control unit is activated when the image processing apparatus is turned on; and resuming the power load operation interrupted at the interrupting at a second timing.

The above and other objects, features, advantages and technical and industrial significance of this invention will be better understood by reading the following detailed descrip-

DETAILED DESCRIPTION OF THE PREFERRED EMBODIMENTS

Exemplary embodiments according to the present invention are explained in detail below with reference to the accompanying drawings. Because the embodiments described below are the exemplary embodiments of the present invention, the embodiments have various limitations that are technically preferred. However, the invention in its broader aspects is not limited to the specific details and representative embodiments shown and described herein. Moreover, not all components described in the embodiments of the present invention are the essential components.

Figure 1:
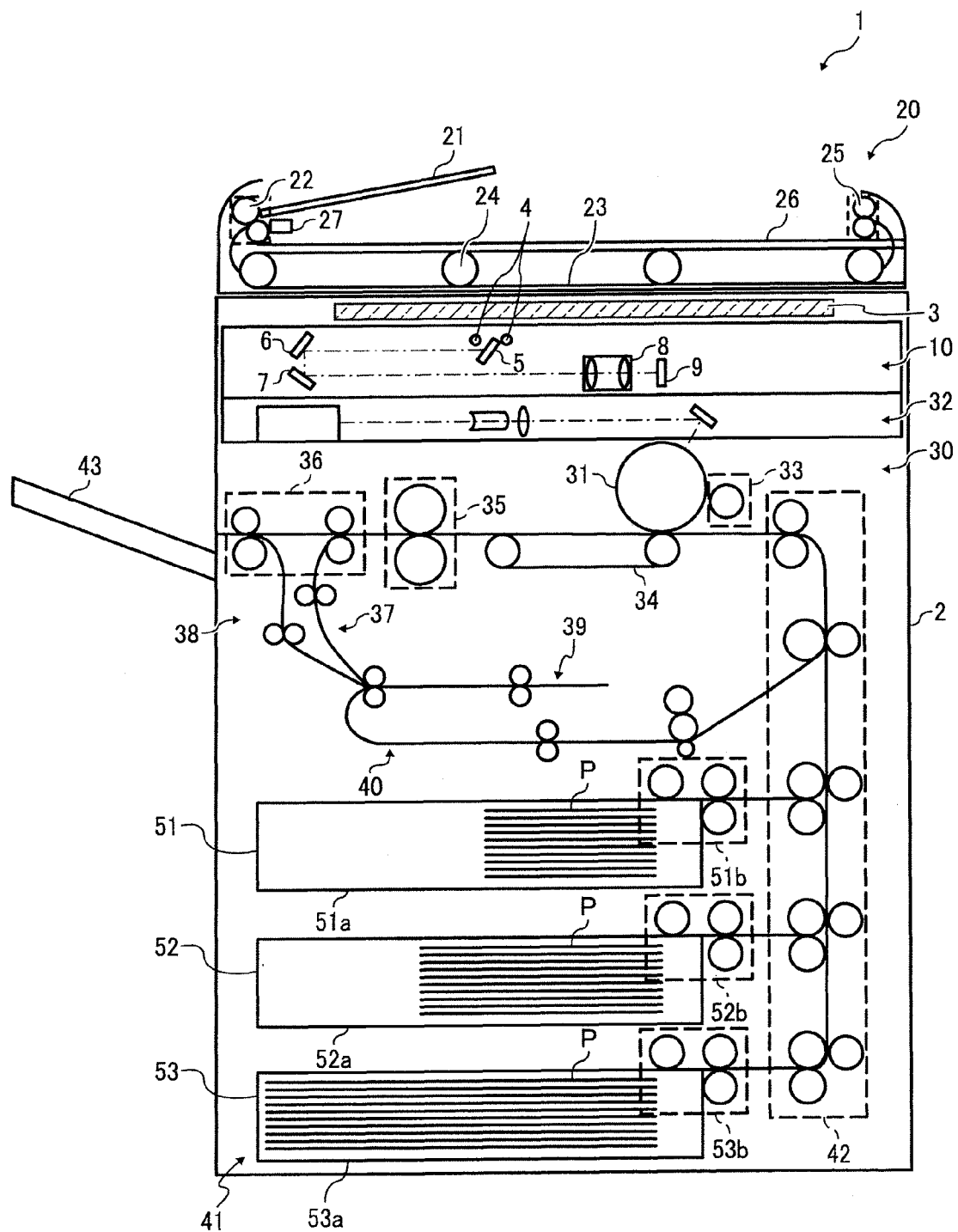
FIG. 1 is a schematic diagram of an MFP according to an embodiment of the present invention.

FIGS. 1 to 4 are schematic diagrams of an image processing apparatus according to a first embodiment of the present invention. FIG. 1 is a schematic diagram of a multifunction peripheral (MFP) 1 as the image processing apparatus of the present invention according to the first embodiment.

As shown in FIG. 1, in the MFP (image processing apparatus) 1, an exposure glass 3 is arranged on an upper surface of a main body 2. A scanner engine unit 10 is arranged below the exposure glass 3 inside the main body 2. The scanner engine unit 10 includes lamps 4 and a first mirror 5 that are mounted on a first carriage (not shown), a second mirror 6 and a third mirror 7 that are mounted on a second carriage (not shown), a lens 8 and a charge coupled device (CCD) 9.

In the scanner engine unit (image processing unit) 10, the first carriage and the second carriage are driven by a motor (not shown). The scanner engine unit 10 moves in a sub-scanning direction, scans in a main-scanning direction and the sub-scanning direction an original that is set on the exposure glass 3, and reads an image of the original.

The MFP 1 includes, in an upper portion of the main body 2, an automatic document feeder (ADF) 20 that is openably attached to an upper surface of the exposure glass 3. When the ADF 20 is opened, the original can be set on the exposure glass 3. When the ADF 20 is closed in a status in which the original is set on the exposure glass 3, the ADF 20 functions as a pressure plate that presses the original to the exposure glass 3.

The ADF 20 includes a plate 21, a feeding roller 22, a feeding belt 23, a plurality of conveying rollers 24 set along the feeding belt 23, a discharging roller 25, a discharging plate 26, and an original-setting detecting sensor 27.

When the ADF 20 is in a status in which a stack of originals is set on the plate 21, and if a print key 64 (see FIG. 2) on an operating unit 60 (see FIG. 2) is pressed, the originals are separated one by one from the lowermost original of the stack of the originals, and sent to the feeding belt 23 by the feeding roller 22. The original that is sent to the feeding belt 23 is fed to a predetermined position on the exposure glass 3 by the feeding belt 23 that is moved by the conveying rollers 24.

Upon reading image data on the original by the scanner engine unit 10, the MFP 1 discharges the original on the exposure glass 3 to the discharging plate 26 by the feeding belt 23 and the discharging roller 25.

The ADF 20 includes a count function by which the ADF 20 counts the number of the originals at each feeding completion of the originals.

Upon detecting by the original-setting detecting sensor 27 that the next original is placed on the plate 21, similarly as mentioned earlier, the MFP 1 causes the ADF 20 to feed the lowermost original on the plate 21 to the predetermined position on the exposure glass 3 by the feeding roller 22 and the feeding belt 23. Upon reading the image data of the original on the exposure glass 3 by the scanner engine unit 10, the MFP 1 discharges the original to the discharging plate 26 by the feeding belt 23 and the discharging roller 25. The feeding roller 22, the feeding belt 23, and the discharging roller 25 are driven by a conveying motor 28 (see FIG. 4).

The MFP 1 includes a printer engine unit 30 on a lower side of the scanner engine unit 10 inside the main body 2. The printer engine unit 30 includes a photosensitive element 31, a writing unit 32, a developing unit 33, a conveying belt 34, a fixing unit 35, a discharging unit 36, a conveying path 37 for both side image formation, a conveying path 38 for discharging a reversed sheet, a reversing unit 39, a conveying unit 40 for both side image formation, a group of feeding units 41, a conveying unit 42, and a discharge tray 43.

The printer engine unit 30 causes a charging unit (not shown) to uniformly charge a surface of the photosensitive element 31 that is driven to rotate in a clockwise direction in FIG. 1 by a main motor (not shown). Furthermore, the printer engine unit 30 causes the writing unit 32 to radiate a writing light beam that is modulated based on the image data read by the scanner engine unit 10 or data received from an external device (for example, personal computer, etc.) (not shown) to the surface of the photosensitive element 31, whereby an electrostatic image is formed on the photosensitive element 31. The printer engine unit 30 feeds toner from the developing unit 33 to the photosensitive element 31 on which the electrostatic latent image is formed to develop the electrostatic latent image into a toner image, and transfers the toner image onto a sheet P that is supplied from one of the feeding units 41 and conveyed by the conveying unit 42 by the conveying belt 34 that includes a transfer function. The printer engine unit 30 conveys the sheet P onto which the toner image is transferred to the fixing unit 35 by the conveying belt 34. In the fixing unit 35, the toner image on the sheet P is fixed thereto by heating while conveying the sheet P by a fixing roller and a pressure roller of the fixing unit 35. Subsequently, the printer engine unit 30 sends the sheet P to the discharging unit 36 and switches a conveyance path by the discharging unit 36. When the sheet P is directly discharged, the discharging unit 36 discharges the sheet P onto the discharge tray 43 set on a lateral face of the main body 2. The printer engine unit 30 cleans the photosensitive element 31 that has completed image transfer by a cleaning unit (not shown) and removes the residual toner, and after a neutralizing unit (not shown) has removed the charge, once again causes the charging unit to uniformly charge the surface of the photosensitive element 31 for the next image formation.

The reversing unit 39 and the conveying unit 40 are connected to the discharging unit 36 by the conveying 37 and the conveying path 38. The reversing unit 39 reverses the surface of the sheet P. The conveying unit 40 conveys the sheet P of which surface is reversed by the reversing unit 39 between the photosensitive element 31 and the conveying belt 34 again via the conveying unit 42. Upon selecting reverse discharge or two-sided recording, the discharging unit 36 sends the sheet P that includes a completely fixed image that is formed on one side or both sides to the reversing unit 39 via the conveying path 38.

Upon selecting reverse discharge, the reversing unit 39 temporarily holds the sheet P received from the discharging unit 36 and sends the reversed sheet P to the discharging unit 36 via the conveying path 38. The discharging unit 36 discharges to the discharge tray 43, the reversed sheet P.

Upon selecting two-sided recording, the conveying unit 40 holds the sheet P of which surface is reversed by the reversing unit 39 and on one side of which an image is formed, and sends the sheet P to the conveying unit 42. The conveying unit 42 again conveys the sheet P between the photosensitive element 31 and the conveying belt 34 to form an image on the other side.

The feeding units 41 include a first feeding unit 51, a second feeding unit 52, and a third feeding unit 53. The first feeding unit 51 to the third feeding unit 53 include feeding trays 51a to 53a and feeding rollers 51b to 53b, respectively. The feeding rollers 51b to 53b separate the sheets P inside each of the feeding trays 51a to 53a one by one and send the sheets P to the conveying unit 42. The feeding units 41 drive the feeding rollers 51b to 53b of the selected first feeding unit 51 to the third feeding unit 53, separates the sheets P in the feeding trays 51a to 53a one by one, and sends the sheets P to the conveying unit 42.

The conveying unit 42 conveys the sheet P received from the first feeding unit 51 to the third feeding unit 53 between the photosensitive element 31 and the conveying belt 34.

Figure 2:
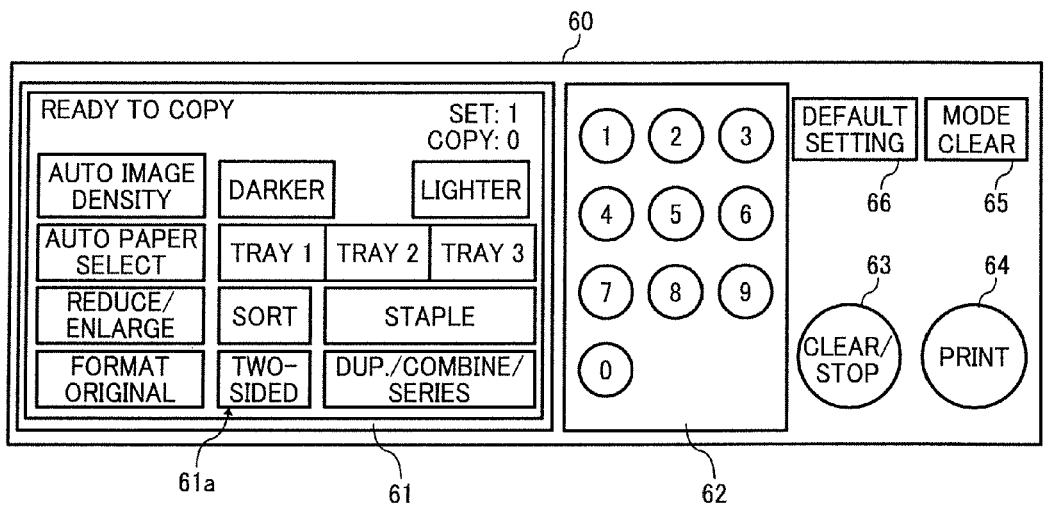
FIG. 2 is a plan view of an operating unit of the MFP shown in FIG. 1.

As shown in FIG. 2, the MFP 1 includes the operating unit 60 in the upper portion of the main body 2. The operating unit 60 includes a liquid crystal display (LCD) (liquid crystal touch panel) 61, a numeric keypad 62, a clear/stop key 63, the print key 64, a mode clear key 65, and a default setting key 66. A touch panel is provided on the LCD 61. Function keys 61a and various information such as the number of copies or messages showing a status of the MFP 1 are displayed on the LCD 61. For example, various data mentioned earlier include data of jam occurrence inside the main body 2, door and cover open data, specifically, power control data related to a power-consumption-reduction control process during power on that is described later, etc. Upon touching the function keys 61a, the touch panel detects a corresponding touch position and enables execution of a function assigned to the corresponding function key 61a.

Figure 3:
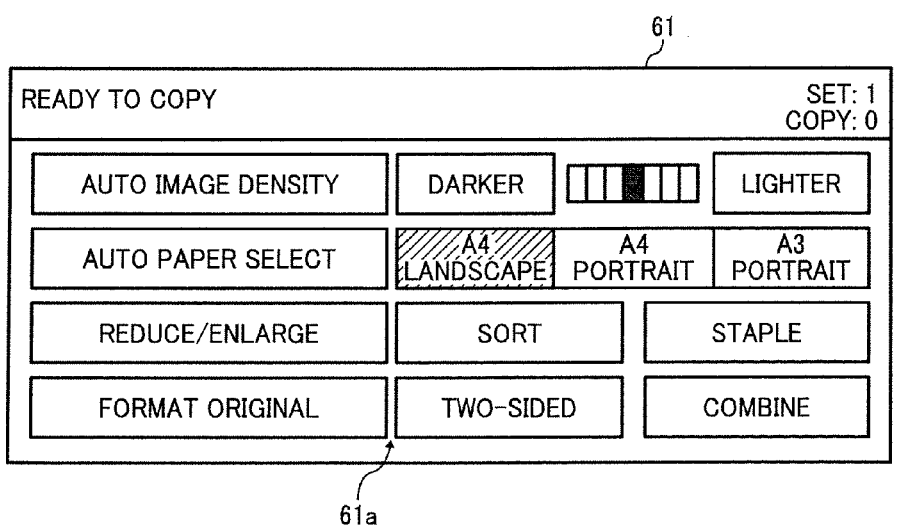
FIG. 3 is a schematic diagram of an example of an usage state of a liquid crystal touch panel shown in FIG. 2.

When an operator touches the function key 61a, for example, as shown in FIG. 3, the LCD 61 mentioned earlier detects the touching operation and displays the touched function key 61a by displaying the function key 61a in black. Furthermore, if the operator touches the function key 61a (for example, "reduce/enlarge" key) to specify functional details, for example, to specify a zoom ratio, the LCD 61 displays a setting screen of detailed functions assigned to the touched function key 61a. Thus, because the LCD 61 uses a dot display indicator, an optimum graphical display can be carried out.

The mode clear key 65 is used when clearing a current operation mode, for example, an energy saving mode, of the MFP 1 and shifting to a normal operation mode.

The default setting key 66 is pressed when arbitrarily customizing a default state of the MFP 1. When the default setting key 66 is pressed, a size of the sheets that are accommodated in the MFP 1 can be set, a status can be arbitrarily set that is to be set when pressing the mode clear key 65 for a copying function. Additionally, selection setting can be carried out for an application, etc. that is to be preferentially selected when no operation is performed for a predetermined period. A time period can be set for shifting to a low-power mode according to International Energy Star Plan, or a time period can be set for shifting to an auto-off/sleep mode. Specifically, the default setting key 66 is used to carry out recording, changing, and cancellation of a standby time period until start of the power-consumption-reduction control process that is performed by the MFP 1 during the power-consumption-reduction control process performed when power is turned on.

Figure 4:
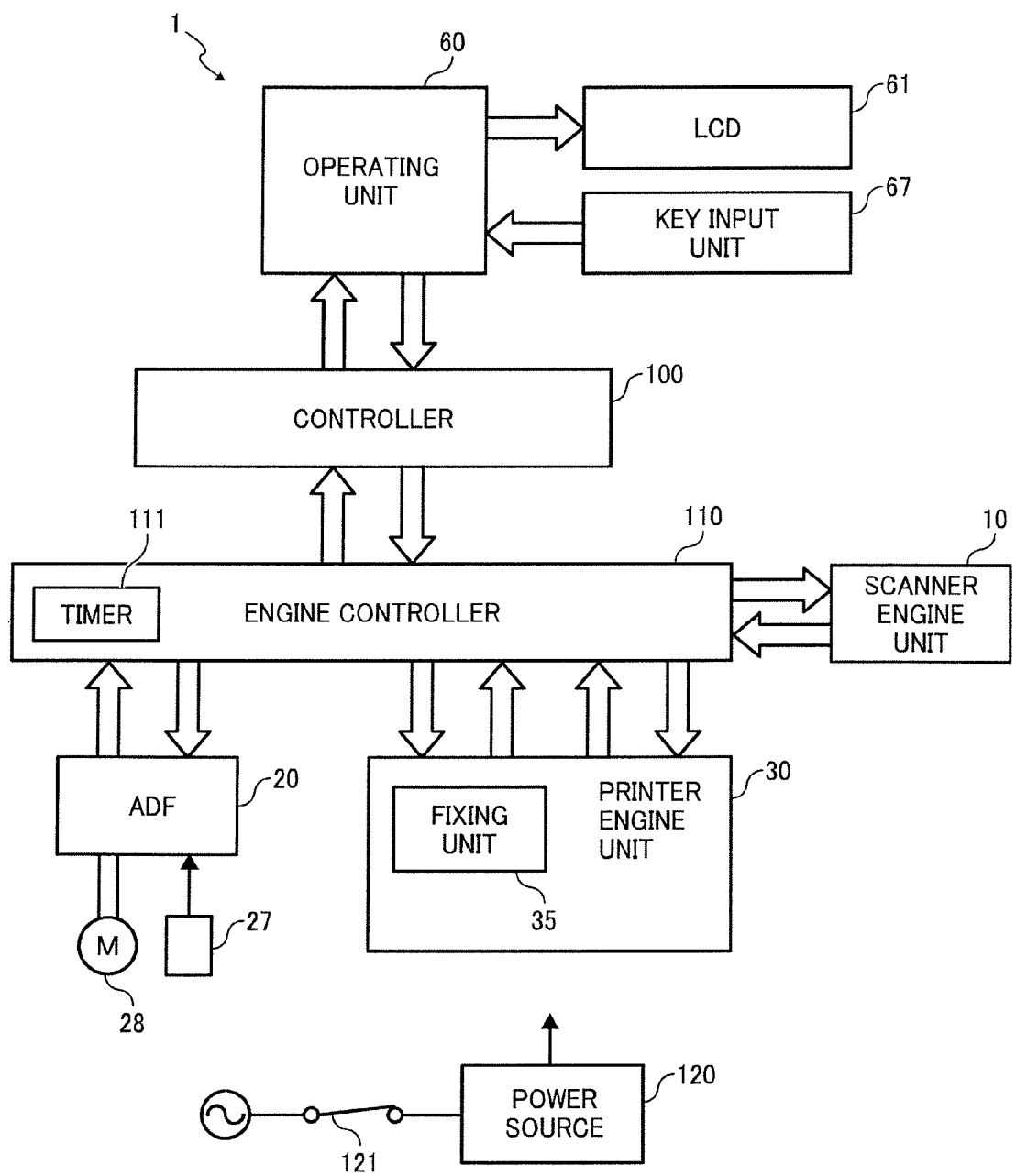
FIG. 4 is a block diagram of the MFP shown in FIG. 1.

As shown in FIG. 4, the MFP 1 includes a controller 100, an engine controller 110, and a power source 120. The controller 100 and the engine controller 110 are connected via a bus or a signal line.

External commercial power is supplied to the power source (power supplying unit) 120 via a power switch 121. The power source 120 performs necessary power regulation such as voltage conversion of commercial power and direct current conversion, and supplies power to each component of the MFP 1.

The operating unit 60 connected to the controller 100 detects operation of hard keys (the numeric keypad 62, the clear/stop key 63, the print key 64, the mode clear key 65, and the default setting key 66) of the operating unit 60 and outputs operation contents to the controller 100. The controller 100 receives a notification of the operation contents from the operating unit 60 and performs an operation process in response to corresponding operation results and also notifies the operating unit 60 of various data or display data of the function keys 61a that is to be displayed on the LCD 61. The operating unit 60 controls display on the LCD 61 based on the display data received from the controller 100. As shown in FIG. 4, the hard keys and the function keys 61a are collectively displayed as a key input unit 67.

Apart from the operating unit 60, the controller (control unit) 100 is connected to the engine controller 110 that exercises distributed control over the scanner engine unit 10, the printer engine unit 30, the fixing unit 35 of the printer engine unit 30, and the ADF 20, thus controlling the entire MFP 1.

The engine controller (image processing controller, interrupting unit, resuming unit) 110 is connected to the printer engine unit 30 that includes the fixing unit 35, the ADF 20, and the scanner engine unit 10.

The conveying motor 28 and the original-setting detecting sensor 27 are connected to the ADF 20. The engine controller 110 includes a timer 111. The timer 111 includes a local oscillator and a divider. Along with the current time, the timer 111 counts various time elapses, specifically, the time elapse after the MFP 1 is turned on.

Depending on an instruction from the controller 100, the engine controller 110 controls the operation of the scanner engine unit 10 and causes the scanner engine unit 10 to read the originals. Furthermore, when the ADF 20 is used in an original reading operation, the engine controller 110 controls various driving units of the conveying motor 28, etc. based on results of detection by sensors such as the original-setting detecting sensor 27, etc., conveys the originals one by one to the exposure glass 3, and controls the reading operation that causes the scanner engine unit 10 to read an image on the original placed on the exposure glass 3.

When the MFP 1 is turned on, the engine controller 110 performs a reading adjusting operation to enhance a reading accuracy of the scanner engine unit 10. The reading adjusting operation is a well-known operation that includes, for example, a positioning process of the first carriage and the second carriage of the scanner engine unit 10, a read-image-data adjusting process based on results of reading a white reference plate, etc. The engine controller 110 executes a reading adjusting operation process that is executed when power is turned on as a target of an interrupting process and a resuming process performed during a power reduction process that is explained later.

The engine controller 110 controls each driving unit of the printer engine unit 30. As mentioned earlier, an image is printed on the sheet by an electrophotographic method based on the original image read by the scanner engine unit 10, image data received from a host computer, etc., or image data received by a facsimile. The engine controller 110 controls the power supply from the power source 120 to a heater of the fixing roller of the fixing unit 35 to control temperature of the fixing roller of the fixing unit 35 to a fixing temperature or a standby temperature, and additionally, controls power supply to the heater of the fixing roller during a power-supply control process at the time of activation.

Based on the time period counted by the timer 111, the engine controller 110 controls operations of the scanner engine unit 10, the printer engine unit 30, and the ADF 20, and also controls power supply to each of the scanner engine unit 10, the printer engine unit 30, and the ADF 20. Specifically, upon switching on the power switch 121 of the MFP 1 and starting the MFP 1, the engine controller 110 controls the power supply within a predetermined time period that is counted by the timer 111.

The MFP 1 includes the power saving mode in which, when a predetermined standby time period in the standby status elapses, power supply to each of the units that are set in advance is stopped or reduced, thereby reducing power consumption. In the power saving mode, for example, power supply to the operating unit 60 is reduced, display of the LCD 61 is stopped, and the backlight is turned off. Additionally, power supply to the heater of the fixing roller of the fixing unit 35 is reduced, the temperature of the fixing roller is controlled to a predetermined standby temperature that is lower than the fixing temperature, and power supply to the heater of the fixing roller is stopped.

The MFP 1 reads power-consumption-reduction control program for executing a power-consumption-reduction control method according to the present invention, which is recorded on a computer readable recording medium, and installs the power-consumption-reduction control program on a memory of the controller 100 or the engine controller 110, such as a read only memory (ROM) or a hard disk. Then, the MFP 1 executes the power-consumption-reduction control method for effective power saving by appropriately performing a power-consumption-reduction control process when the power is turned on. The recording medium includes the ROM, an electrically erasable and programmable read only memory (EEPROM), an erasable and programmable read only memory (EPROM), a flash memory, a flexible disk, a compact disk read only memory (CD-ROM), a compact disk rewritable (CD-RW), a digital versatile disk (DVD), a secure digital (SD) card, a magneto-optical (MO) disk, etc. The power-consumption-reduction control program is a computer executable program, which is written in legacy programming languages such as assembler, C, C++, C#, Java (registered trademark) or object-oriented programming languages, and that can be distributed by storing in the recording media mentioned earlier.

The MFP 1 according to the present embodiment performs the power-consumption-reduction control process that appropriately controls interruption and resume of the operations of each of the scanner engine unit 10, the printer engine unit 30, and the ADF 20 during a predetermined time period after the MFP 1 is turned on by switching on the power switch 121.

In other words, upon switching on the power switch 121, the MFP 1 supplies power from the power source 120 to the controller 100 and the engine controller 110. Along with causing the scanner engine unit 10, the printer engine unit 30, and the ADF 20 to start necessary initial setting operations, the engine controller 110 starts establishing communication with the controller 100.

For example, a time zone (for example, from 7 am to 11 pm) in which a usage frequency of the MFP 1 is high because people are in a company is already recorded as a high-frequency time zone. Similarly, a time zone (for example, from 11 pm to 7 am) in which the usage frequency of the MFP 1 is low because a few people are in a company is already recorded as a low-frequency time zone. Additionally, a predetermined power-consumption-reduction standby time period after turning on the power is already set and recorded. The high-frequency time zone, the low-frequency time zone, and the power-consumption-reduction standby time period are already set as default values at the time of factory shipment of the MFP 1. However, a user can suitably change the settings according to operations of the operating unit 60 depending on usage environment of the user. The power-consumption-reduction standby time period is a standby time period after switching on the power switch 121 until executing a necessary power-consumption reduction process.

The power-consumption-reduction control process that is performed by the MFP 1 based on the power-consumption-reduction standby time period, the high-frequency time zone, and the low-frequency time zone is explained below.

If the time after lapse of the power-consumption-reduction standby time period is in the low-frequency time zone, the MFP 1 executes the power-consumption-reduction control process. For example, when the power switch 121 of the MFP 1 is switched on, the engine controller 110 compares the current time zone counted by the timer 111 with the low-frequency time zone and the high-frequency time zone that are stored in the memory, and determines whether the time when the power is turned on is in the low-frequency time zone or the high-frequency time zone.

Moreover, when the power switch 121 is switched on, the engine controller 110 causes, during the predetermined timing, each unit such as the scanner engine unit 10 and the printer engine unit 30 controlled by the engine controller 110, to perform an initial operation or a process control, and performs an appropriate operation when operation start is instructed.

Meanwhile, when the power switch 121 is switched on, the controller 100 carries out necessary initial settings of each unit of the MFP 1 and carries out necessary display on the operating unit 60. The controller 100 enables signal acquisition from various sensors to be ready for starting the operations.

In the MFP 1, when the power switch 121 is switched on, the controller 100 and the engine controller 110 mutually exchange commands and establish communication by negotiating. The engine controller 110 controls, under the control of the controller 100, the scanner engine unit 10 and the printer engine unit 30 so that various operations (a scanning operation, a printing operation, a copying operation, etc.) that utilize the scanner engine unit 10 and the printer engine unit 30 can be performed.

The engine controller 110, as mentioned earlier, determines whether the current time when the power switch 121 of the MFP 1 is switched on is in the low-frequency time zone or the high-frequency time zone. If a timing when the power switch 121 is switched on is in the low-frequency time zone, the engine controller 110 interrupts the initial setting operations (power load operations) such as the initial operation or the process control by the scanner engine unit 10 and the printer engine unit 30, and executes the power-consumption reduction process for reducing power consumption by the initial operation or the process control, etc.

If the current time when the power switch 121 of the MFP 1 is switched on is in the high-frequency time zone, the engine controller 110 starts counting the power-consumption-reduction standby time period by the timer 111, and checks whether the high-frequency time zone has shifted to the low-frequency time zone (whether interruption condition is satisfied) before the timer 111 finishes counting the power-consumption-reduction standby time period. If the high-frequency time zone has shifted to the low-frequency time zone before the power-consumption-reduction standby time period has elapsed, the engine controller 110 executes the power-consumption reduction process that is mentioned earlier. For example, assuming that the high-frequency time zone is from 7 am to 11 pm, the low-frequency time zone is from 11 pm to 7 am, and the power-consumption-reduction standby time period is one hour, if the clock turns 11 pm before the lapse of the one-hour power-consumption-reduction standby time period that is counted after switching on the power switch 121 of the MFP 1, the engine controller 110 executes the power-consumption reduction process that interrupts the initial setting operations (power load operations) such as the process control to reduce the power consumption.

Alternatively, if the current time when the power switch 121 is switched on is in the low-frequency time zone (from 11 pm to 7 am), as mentioned earlier, the power-consumption reduction process is carried out that interrupts the initial setting operations (power load operations) such as the process control. However, if the low-frequency time zone shifts to the high-frequency time zone before the lapse of the power-consumption-reduction standby time period (for example, one hour) counted after switching on the power switch 121, for example, if the clock turns 7 am, the engine controller 110 resumes the interrupted initial setting operations (power load operations) such as the process control or the initial operation that are necessary for normal execution of the operations of the MFP 1, so that the user can always use the MFP 1.

The timing to interrupt the power load operations can be arbitrarily set according to the operations of the operating unit 60.

Thus, in the MFP 1 according to the present embodiment, at the time of activating the MFP 1, along with performing various imaging processes, the engine controller 110 that controls the operations of the scanner engine unit 10 and the printer engine unit 30 that execute various setting operations based on power load as the power load operations interrupts the power load operations performed by the scanner engine unit 10 and the printer engine unit 30 at an arbitrary timing after the activation and resumes the interrupted power load operations at an arbitrary timing.

Consequently, at an arbitrary timing at which the user cannot use the MFP 1, the power load operations can be interrupted to reduce power consumption. Also, at a timing at which the user can use the MFP 1, the power load operations are resumed, enabling the user to appropriately use the MFP 1, thereby enhancing usability.

In the MFP 1 according to the present embodiment, the engine controller 110 interrupts the power load operations at a timing at which prior-set interruption conditions are satisfied. Furthermore, the engine controller 110 resumes the interrupted power load operations at a timing at which prior-set resume conditions are satisfied.

Consequently, the power load operations can be interrupted or resumed at a timing at which the interruption condition or the resume condition that is set depending on the usage environment of the MFP 1 is satisfied, so that usability can be further enhanced, and power consumption can be reduced.

In the MFP 1, the engine controller 110 causes each of the scanner engine unit 10, the printer engine unit 30, and the ADF 20 to carry out the initial setting operations (power load operations). For example, in the scanner engine unit 10, an initial operation process (power load operations) is carried out that causes the carriage to shift to the predetermined position and wait. The printer engine unit 30 executes a printing operation of the photosensitive element or the developing unit during a definite time period, in which the fixing unit 35 is also temporarily heated to the fixing temperature, so that an amount of power consumption is greater in the process (power load operations).

Moreover, in the MFP 1, when the power-consumption-reduction standby time period is already set, for example, as 60 seconds and if the MFP 1 is turned on, the engine controller 110 starts counting the power-consumption-reduction standby time period by the timer 111 and also starts the initial operation such as establishing communication with the controller 100. When the power-consumption-reduction standby time period has elapsed and the communication with the controller 100 is not established, the engine controller 110 causes the scanner engine unit 10 and the printer engine unit 30 to interrupt the initial setting operation (power load operations) process and performs the power-consumption reduction process that reduces the power consumption in the scanner engine unit 10 and the printer engine unit 30.

Subsequently, when communication is established with the controller 100, the engine controller 110 causes the scanner engine unit 10 and the printer engine unit 30 to resume the interrupted initial setting operation (work load operation) process such that the user can always use the MFP 1.

In the initial setting operation (power load operations) process performed by the printer engine unit 30, for example, power supply from the power source 120 to the heater of the fixing roller of the fixing unit 35 is controlled thereby controlling the temperature of the fixing roller of the fixing unit 35 to the fixing temperature or the standby temperature. Even if the initial setting operation process is carried out in an unstable status when the communication between the controller 100 and the engine controller 110 is not established, it is unclear whether normal control can be executed, and power wastage is likely to occur. Due to this, the initial setting operation (power load operations) process that controls power supply to the heater of the fixing roller is interrupted in this situation to reduce power consumption. Subsequently, when communication between the engine controller 110 and the controller 100 is established, the engine controller 110 resumes the initial setting operation (power load operations) process that controls the power supply to the heater of the fixing roller of the fixing unit 35, enables usage of the printer engine unit 30 and enhances usability.

The initial setting operation (power load operations) process of the scanner engine unit 10 includes initial setting operations such as a positioning process of the carriage of the scanner engine unit 10 and a read-image-data adjusting process based on the results of reading the white reference plate. The engine controller 110 performs the interrupting process and the resuming process of the initial setting operation as a target of the initial setting operation of the scanner engine unit 10.

Thus, in the MFP 1 according to the present embodiment, the engine controller 110 interrupts the power load operations under the interruption condition in which no communication is established between the controller 100 and the engine controller 110 at a time when the predetermined standby time period has elapsed after the MFP 1 is turned on, and resumes the interrupted power load operations under the resume condition in which communication is established between the controller 100 and the engine controller 110.

Consequently, a power load operation can be interrupted with time and power consumption can be efficiently reduced.

In the MFP 1 according to the present embodiment, the initial setting operation (power load operations) process for controlling power supply to the heater of the fixing roller of the printer engine unit 30 is interrupted to reduce power consumption, and the interrupted initial setting operation (power load operations) process is resumed, thereby enabling the usage of the printer engine unit 30.

Consequently, along with appropriately reducing power consumption of the printer engine unit 30, usability can be enhanced.

Moreover, in the MFP 1 according to the present embodiment, the initial setting operations are performed such as the positioning process of the carriage of the scanner engine unit 10 and the read-image-data adjusting process based on the results of reading the white reference plate. The engine controller 110 performs the interrupting process and the resuming process of the initial setting operations as a target of the initial setting operations of the scanner engine unit 10.

Consequently, by interrupting the power-consuming operations such as adjusting operations of the scanner engine unit 10, power consumption after turning on the power can be reduced with further efficiency and the usability can also be maintained.

Although the invention has been described with respect to an exemplary embodiment, the present invention is not to be thus limited but is to be construed as embodying all modifications and alternative constructions within the scope of the invention.

According to an aspect of the present invention, the image processing apparatus can reduce power consumption and enhance usability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image processing unit that performs an image processing operation and further starts an initial setting operation when the image processing apparatus is turned on;
   a first control unit that controls the image processing unit;
   a second control unit that controls an operation of the first control unit by communicating with the first control unit; and
   a power supply unit that supplies power to a relevant unit,
      wherein the first control unit starts establishing communication with the second control unit when the image processing apparatus is turned on, and
      if the establishing communication is not completed at a time when a predetermined standby time period has elapsed after the image processing apparatus is turned on, the first control unit interrupts the initial setting operation, and
      then, when the establishing communication is completed, the first control unit resumes the interrupted initial setting operation, and
   wherein the first control unit determines whether to interrupt the initial setting operation based in part on time zone information.

2. The image processing apparatus according to claim 1, wherein the image processing unit includes an image forming unit that forms a latent image on a photosensitive element by irradiating the photosensitive element with a light beam modulated on image data, develops the latent image into a visible image with a developer, and transfers the visible image onto a recording medium, and a fixing unit that is heated to a fixing temperature by a power supply from the power supply unit and fixes the visible image onto the recording medium, and the initial setting operation includes a power load operation, which is a temperature control operation for controlling a temperature of the fixing unit to the fixing temperature.

3. The image processing apparatus according to claim 1, wherein the image processing unit includes an image reading unit that reads an image of an original by scanning the original with a light beam and photoelectrically converting a reflected light beam reflected from the original, and the initial setting operation includes a power load operation, which is a reading adjusting operation by the image reading unit for improving a reading accuracy.

4. An image processing method for an image processing apparatus including an image processing unit that performs an image processing operation and further starts an initial setting operation when the image processing apparatus is turned on, a first control unit that controls the image processing unit, a second control unit that controls an operation of the first control unit by communicating with the first control unit, and a power supply unit that supplies power to a relevant unit, the image processing method comprising:
   causing the first control unit to start establishing communication with the second control unit when the image processing apparatus is turned on;
   if the establishing communication is not completed at a time when a predetermined standby time period has elapsed after the image processing apparatus is turned on, causing the first control unit to interrupt the initial setting operation; and
   then, when the establishing communication is completed, causing the first control unit to resume the interrupted initial setting operation, and
   wherein the first control unit determines whether to interrupt the initial setting operation based in part on time zone information, and wherein the time zone information is based on frequency of usage of the image processing apparatus.

5. The image processing method according to claim 4, wherein the image processing unit includes an image forming unit that forms a latent image on a photosensitive element by irradiating the photosensitive element with a light beam modulated on image data, develops the latent image into a visible image with a developer, and transfers the visible image onto a recording medium, and a fixing unit that is heated to a fixing temperature by a power supply from the power supply unit and fixes the visible image onto the recording medium, and the initial setting operation includes a power load operation, which is a temperature control operation for controlling a temperature of the fixing unit to the fixing temperature.

6. The image processing method according to claim 4, wherein the image processing unit includes an image reading unit that reads an image of an original by scanning the original with a light beam and photoelectrically converting a reflected light beam reflected from the original, and the initial setting operation includes a power load operation, which is a reading adjusting operation by the image reading unit for improving a reading accuracy.

7. A computer program product comprising a non-transitory computer-usable medium having computer-readable program codes embodied in the medium for processing an image in an image processing apparatus including an image processing unit that performs an image processing operation and further starts an initial setting operation when the image processing apparatus is turned on, a first control unit that controls the image processing unit, a second control unit that controls an operation of the first control unit by communicating with the first control unit, and a power supply unit that supplies power to a relevant unit, the program codes when executed causing a computer to execute:

causing the first control unit to start establishing communication with the second control unit when the image processing apparatus is turned on;

if the establishing communication is not completed at a time when a predetermined standby time period has elapsed after the image processing apparatus is turned on, causing the first control unit to interrupt the initial setting operation; and then, when the establishing communication is completed, causing the first control unit to resume the interrupted initial setting operation, and wherein the first control unit determines whether to interrupt the initial setting operation based in part on time zone information, such that a power-consumption-reduction control process is performed in a low frequency of use time zone.

8. The computer program product according to claim 7, the image processing unit includes an image forming unit that forms a latent image on a photosensitive element by irradiating the photosensitive element with a light beam modulated on image data, develops the latent image into a visible image with a developer, and transfers the visible image onto a recording medium, and a fixing unit that is heated to a fixing temperature by a power supply from the power supply unit and fixes the visible image onto the recording medium, and the initial setting operation includes a power load operation, which is a temperature control operation for controlling a temperature of the fixing unit to the fixing temperature.

9. The computer program product according to claim 7, the image processing unit includes an image reading unit that reads an image of an original by scanning the original with a light beam and photoelectrically converting a reflected light beam reflected from the original, and the initial setting operation includes a power load operation, which is a reading adjusting operation by the image reading unit for improving a reading accuracy.

\* \* \* \* \*